Patented Aug. 4, 1931

1,817,561

UNITED STATES PATENT OFFICE

IRVIN W. HUMPHREY, OF DOVER, NEW JERSEY, ASSIGNOR TO HERCULES POWDER COMPANY, OF WILMINGTON, DELAWARE, A CORPORATION OF DELAWARE

LACQUER

No Drawing.     Application filed June 10, 1926. Serial No. 115,127.

My invention relates to lacquers and more especially to those lacquers which include a nitrated product, for example, nitrocellulose, as a constituent.

Heretofore in certain applications for Letters Patent of the United States filed by me, Serial No. 751,682, filed November 22, 1924, and Serial No. 50,839, filed August 17, 1925, there were disclosed lacquers including as an ingredient oxidized pine oil.

Oxidized pine oil as an ingredient of lacquer is possessive of great merit in that it possesses the property of dissolving the gums and resins used in laquers and in that it serves, to some extent, as a substitute for castor oil and other substances which are used to produce a film of high flexibility. Oxidized pine oil containing, as a result of oxidation, camphor and fenchone, also has a colloiding effect on the nitrocellulose, included as a constituent of the lacquer, and may be utilized in partial or full substitute for the previously used colloiding agents.

While the use of oxidized pine oil in lacquers is advantageous and results in the production of a superior lacquer, the process necessary for the production of the oxidized pine oil is substantially expensive.

Now it is the object of my present invention to provide an ingredient for lacquers which will enable the production of a lacquer possessing substantially the same merit and superiority as that produceable with the use of oxidized pin oil and at a substantial decrease in cost. The ingredient the use of which constitutes my invention may be substituted for oxidized pine oil in part, or oxidized pine oil may be eliminated if replaced in part by the proper colloiding agent.

In accordance with my invention, I utilize dipentene as an ingredient for lacquers.

Dipentene has a specific gravity of about 0.845 and distils at about 175-7° C. Dipentene is, for example, obtained by fractional distillation of the volatile oil from pine stumps as a middle cut between turpentine, which is composed largely of pinene, and pine oil composed largely of terpene alcohols.

For the purposes of my invention, it is not essential that the dipentene be pure since it may be utilized as present in, for example, a middle cut between turpentine and pine oil, and which approximately 90% will distil between 165° C. and 190° C.

In utilizing the dipentene in the production of lacquers, it may be used with the usual ingredients of lacquers including gums, colloiding agents and plasticizers, it only being necessary to include a sufficient amount of colloiding agent to desirably colloid the nitrated product, since dipentene is not itself a solvent for nitrated products as is oxidized pine oil.

Wide variations are permissible in the amount of dipentene which may be used in the production of lacquer, the amount ranging from say 1% to 20%.

As a typical formula for the production of a lacquer including dipentene as an ingredient, in accordance with my invention, the following is illustrative.

| | Per cent |
|---|---|
| Nitrocotton | 10.5 |
| Denatured alcohol | 4.5 |
| Toluene | 26.0 |
| Gum solution | 16.5 |
| Dipentene | 10.0 |
| Diethyl phthalate | 5.0 |
| Ethyl acetate | 7.5 |
| Amyl acetate | 10.5 |
| Butyl acetate | 10.0 |
| | 100.0 |

The lacquers including dipentene will be found to be of superior quality and capable of producing films of great smoothness and high gloss. The dipentene, as has been indicated, is an excellent solvent for the usual gums, constituents of lacquers, and further, will blend well with the various other usual ingredients used in lacquers.

It will be understood that I contemplate as within the scope of my invention the use of substances operable equivalents for nitrocellulose specifically claimed by me herein.

Having now fully described my invention, what I claim and desire to protect by Letters Patent is:—

1. A lacquer including nitrocellulose, dipentene and a colloiding agent.

2. A lacquer including nitrated cellulose, oxidized pine oil and dipentene.

3. A lacquer including nitrocellulose and dipentene as ingredients.

4. A lacquer including nitrocellulose, a gum and dipentene as ingredients.

In testimony of which invention, I have hereunto set my hand, at Kenvil, N. J., on this 7th day of June, 1926.

IRVIN W. HUMPHREY.